US000001164H

United States Statutory Invention Registration [19]

[11] Reg. Number: H1164

Wade, Jr. et al.

[43] Published: Apr. 6, 1993

[54] METHOD OF TREATING THE SURFACE OF COMMERCIALLY AVAILABLE POLYMER FILMS

[75] Inventors: William L. Wade, Jr., Neptune; Robert J. Mammone, So. Plainfield, both of N.J.; Michael Binder, Brooklyn, N.Y.

[73] Assignee: The United States of America as represented by the Secretary of the Army, Washington, D.C.

[21] Appl. No.: 714,469

[22] Filed: Jun. 13, 1991

[51] Int. Cl.[5] ..... B29C 35/04; H05B 11/00

[52] U.S. Cl. ..... 264/22; 264/83; 427/40; 427/322; 427/307; 156/272; 156/643; 156/646

[58] Field of Search ..... 427/40, 38, 322, 307, 427/39, 35, 79; 156/272.6, 643, 646

[56] References Cited

U.S. PATENT DOCUMENTS 4,382,101 5/1983 Polak ..... 427/40

4,468,412 8/1984 Fujii et al. ..... 427/38

4,765,860 8/1988 Ueno et al. ..... 156/272.6

*Primary Examiner*—Richard D. Lovering

*Assistant Examiner*—Joseph D. Anthony

*Attorney, Agent, or Firm*—Michael Zelenka; Roy E. Gordon

[57] ABSTRACT

The surface of commercially available polymer films are treated with a low temperature gas plasma to improve the subsequent bonding of aluminum to the polymer surface without the need for adhesives.

5 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF TREATING THE SURFACE OF COMMERCIALLY AVAILABLE POLYMER FILMS

GOVERNMENT INTEREST

The invention described herein may be manufactured, used, and licensed by or for the Government for governmental purposes without the payment to us of any royalty thereon.

FIELD OF INVENTION

This invention relates in general to a method of treating the surface of commercially available polymer films, and in particular to such a method involving treatment with a low temperature gas plasma so as to improve the subsequent bonding of aluminum to the polymer surface without the need for adhesives.

BACKGROUND OF THE INVENTION

Aluminum is commonly used in the capacitor industry as a coating for polymer films. This is because aluminum is a light weight conductor and is easily vapor deposited. However, difficulties are encountered in bonding aluminum to the polymer surface without the need for adhesives.

Efforts have concentrated on modifying polymer surfaces by means of electric corona discharge, ion bombardment and use of various chemical etching solutions.

All of these methods suffer from serious drawbacks. Electric corona discharge requires a high voltage AC or DC electric field. Ion bombardment is directional, that is, implanted ions only enter surfaces that are in direct line and exposed to the ion beam. It is generally difficult to treat both sides of a film or irregularly shaped objects. Etching solutions are messy, have to be disposed of safely, and can be dangerous.

SUMMARY OF THE INVENTION

The general object of this invention is to provide a method of improving the water wettability and adhesion of vapor deposited aluminum to commercially available polymer films.

It has now been found that the foregoing object can be attained and that the water wettability and adhesion of vapor deposited aluminum to the surface of thin films of about 8 to 12 microns in thickness of polyethylene, polypropylene, polyester, polysulfone, polycarbonate and polyvinylidene fluoride can be dramatically improved by briefly exposing the surfaces to a low temperature, low pressure gas plasma of either oxygen, 96%$CF_4$/4% $O_2$ or helium.

In carrying out the method of the invention, coupons about 7.5 cm×10 cm and 8 to 12 micron thick are treated in a plasma etcher for 4 minutes at 250 watts with a gas pressure of 150 Torrs and a gas flow rate of 0.3 ml/min. Based on the chamber volume, the power density is 0.002 watts/$cm^2$. Three separate gas plasmas are included; oxygen, helium, and a mixture of 96% $CF_4$/4%$O_2$. Following the various plasma treatments, a telescopic goniometer is used to measure the static contact angle made by a water drop on the various film surfaces. Samples are then taped to a polyethylene carrier and rapidly metallized with approximately 100 to 150 angstroms of aluminum in a commercial metallizer. The elapsed time between the plasma treatments and aluminum deposition in one case is about 1 month. Adhesion of aluminum is qualitatively determined by applying a piece of adhesive tape to the metallized polymer surface, removing the tape and observing how much aluminum is removed from the film.

The contact angle between the edge of a drop of water and a film surface reflects the wettability of the film surface by water. Contact angle measurements are a simple method for determining the hydrophobic or hydrophillic nature of attached chemical groups on surfaces. Liquids similar in composition to chemical groups on the film coat the surface well and make smaller contact angles with the surface than liquids containing dissimilar groups. The contact angle of water with typical hydrophobic surfaces is approximately 65–95 degrees.

TABLE I

Contact angle of water (in degrees) and relative adhesion of vapor deposited aluminum (described as either A, B or C) to surfaces of selected polymer films that had been exposed to various plasma treatments. For each polymer and treatment procedure, the contact angle is listed on the left and the relative adhesion of aluminum is listed on the right.

CONTACT ANGLE OF ADHESION OF ALUMINUM

| POLYMER | Untreated | $O_2$ | $CF_4/O_2$ | He |
|---|---|---|---|---|
| Polycarbonate | 72/B | 39/A | <15/A | 37/A |
| Polysulfone | 70/A | 25/A | <15/A | 26/A |
| Polyester | 66/C | 29/A | 30/A | 29/A |
| PVDF | 71/C | 40/A | 70/A | 57/A |
| Polypropylene | 98/C | 40/A | 72/A | 53/A |
| Polyethylene | 90/C | —/— | 20/A | 50/A |
| Polystyrene | 83/B | 15/A | <15/A | 26/A |

A = Excellent Adhesion
B = Good Adhesion
C = Poor Adhesion

Table I summarizes the experimental results on wettability and adhesion of the various polymers following treatment with oxygen, helium and $CF_4/O_2$. For each polymer and treatment procedure, the contact angle in degrees is listed on the left of the line and the relative adhesion of aluminum to the sample is listed as either A, B, or C on the right side. The contact angle of water decreases following plasma treatments. The decrease in contract angle, that ranges from insignificant (polyvinylidene fluoride) after exposure to $CF_4/O_2$ plasma) to dramatic (for most of the others), indicates that the polymer surfaces have become more receptive to water, that is, improved wettability.

Helium treatment has the least effect on the contact angle of any of the polymers with the exception of polyester. Oxygen plasma treatment has the greatest effect in reducing the contact angle for polyvinylidene fluoride and polypropylene while $CF_4/O_2$ plasma treatment has the greatest effect in reducing the contact angle for polycarbonate, polysulfone and polystyrene.

It is readily apparent from Table I that aluminum adhesion to polycarbonate, polyester, polyvinylidene fluoride, polyethylene, and polypropylene improve substantially after their surfaces have been briefly exposed to gas plasma. In fact, tested polymer samples exposed to any of the three plasmas have excellent adhesion of aluminum. Since one month has elapsed between the time that these polymers had been exposed to the gas plasmas and the time that they were metallized, the effects of plasma treatment is apparently retained even after being exposed to air for one month.

Improved adhesion of aluminum to the various polymer surfaces and the reduced contact angles of water on the polymer surfaces following plasma treatments may be due to removal of impurity layers from the polymer surface, thus allowing better wettability and aluminum adhesion. This possibility, however, does not account for the variations in contact angle observed after exposure of the polymers to the different plasmas. A more likely possibility is that exposure to gas plasma forms reactive groups on the polymer surface which, upon subsequent exposure to oxygen in the atmosphere, may allow covalent oxygen bonds to be formed. During metallization, the aluminum can react with these oxygen groups to form strong bonds. In fact, formation of aluminum-oxygen-polymer complexes at surfaces of aluminum vapor coated, oxygen plasma treated polymers has been noted as improving adhesion between the metal and the polymer. Since these oxygen complexes are formed after exposure of plasma treated polymers to air, the type of oxygen groups formed on the polymer surface should be similar for the various gas plasmas studied. This would perhaps explain why there was no apparent difference in adhesion of aluminum to polymer samples exposed to $O_2$, $CF_4/O_2$ or He plasmas. For all of the polymers studied, exposure to any of the three gas plasmas produces excellent aluminum adhesion.

The exact amount of treatment required for maximum adhesion for a given polymer can perhaps be further optimized by varying the power density, temperature, and total time in the plasma environment.

We wish it to be understood that we do not desire to be limited to the exact details of construction as described for obvious modifications will occur to a person skilled in the art.

What is claimed is:

1. Method of treating the surface of commercially available polymer films wherein the polymer is selected from the group consisting of polyethylene, polypropylene, polyester, polysulfone, polycarbonate, and polyvinylidene fluoride, said method comprising treating the surface of the polymer film with a low temperature gas plasma so as to improve the subsequent bonding of aluminum to the polymer surface without the need for adhesives.

2. Method according to claim 1 wherein the gas plasma is selected from the group consisting of oxygen, 96% $CF_4$/4%$O_2$, and helium.

3. Method according to claim 2 wherein the gas plasma is oxygen.

4. Method according to claim 2 wherein the gas plasma is 96% $CF_4$/4%$O_2$.

5. Method according to claim 2 wherein the gas plasma is helium.

* * * * *